United States Patent
Wilkins et al.

(10) Patent No.: US 10,087,824 B2
(45) Date of Patent: Oct. 2, 2018

(54) WASTEGATE WITH INJECTED FLOW

(71) Applicant: HONEYWELL INTERNATIONAL INC., Morristown, NJ (US)

(72) Inventors: Christopher W. Wilkins, Lawndale, CA (US); Wagner M. Magalhaes, Torrance, CA (US); Bharathi Raja Sugumaran, Bangalore (IN); Martin Babak, Velka Bites (CZ)

(73) Assignee: GARRETT TRANSPORTATION 1 INC., Torrance, CA (US)

( * ) Notice: Subject to any disclaimer, the term of this patent is extended or adjusted under 35 U.S.C. 154(b) by 412 days.

(21) Appl. No.: 14/631,659

(22) Filed: Feb. 25, 2015

(65) Prior Publication Data

US 2016/0245157 A1    Aug. 25, 2016

(51) Int. Cl.
*F02B 37/18* (2006.01)
*F02C 6/12* (2006.01)

(52) U.S. Cl.
CPC ............ *F02B 37/183* (2013.01); *F02B 37/18* (2013.01); *F02C 6/12* (2013.01); *Y02T 10/144* (2013.01)

(58) Field of Classification Search
CPC ...... F02B 37/18; F02B 37/183; F02B 37/186; F05D 2220/40; F01D 17/105; F01D 9/047; F02C 6/12; F02D 41/0007
See application file for complete search history.

(56) References Cited

U.S. PATENT DOCUMENTS

| | | |
|---|---|---|
| 3,464,357 A | 9/1969 | Duport et al. |
| 3,994,620 A | 11/1976 | Spraker, Jr. et al. |
| 4,240,519 A * | 12/1980 | Wynosky ............... F02K 1/827 181/213 |
| 4,280,797 A | 7/1981 | Pfeil |
| 4,566,270 A | 1/1986 | Ballard |

(Continued)

FOREIGN PATENT DOCUMENTS

| | | |
|---|---|---|
| EP | 0 020 594 A | 1/1981 |
| EP | 0 477 579 A2 | 4/1992 |

(Continued)

OTHER PUBLICATIONS

Communication, including an extended European Search Report and a written opinion, mailed by the EPO, dated Jul. 25, 2016, for copending European application EP 16 15 5731.
Communication, including an extended European Search Report and a written opinion, mailed by the EPO, dated Jul. 21, 2016, for counterpart European application EP 16 15 5608.
"Communication Pursuant to Article 94(3) EPC" for counterpart European application EP 16 155 608.9, mailed by the EPO, dated Aug. 14, 2017.

*Primary Examiner* — Woody Lee, Jr.
*Assistant Examiner* — Brian O Peters
(74) *Attorney, Agent, or Firm* — The Law Office of John A. Griecci

(57) ABSTRACT

A turbocharger turbine having housing walls defining a diffuser. Within the diffuser, a center body within the diffuser is supported by de-swirl vanes extending from the diffuser wall. The center body forms a de-swirl passageway having an increasing mean diameter of flow from an upstream end of the center body to a leading edge of the de-swirl vanes. A trailing edge of the de-swirl vanes is near the downstream end of the center body. Annular-type guide vanes surround the center body within the de-swirl passageway. A wastegate system is configured to vent wastegate flow into the diffuser through injection ports on the de-swirl vanes, annular guide vanes and/or center body.

8 Claims, 4 Drawing Sheets

(56) References Cited

U.S. PATENT DOCUMENTS

| | | | |
|---|---|---|---|
| 4,656,834 A * | 4/1987 | Elpern | F02B 37/183 |
| | | | 251/68 |
| 5,269,132 A * | 12/1993 | Loucks | F02K 1/825 |
| | | | 239/127.1 |
| 5,338,155 A | 8/1994 | Kreitmeier | |
| 5,791,148 A | 8/1998 | Burrus | |
| 6,202,413 B1 | 3/2001 | Baker et al. | |
| 8,776,527 B1 | 7/2014 | Sokhey et al. | |
| 9,249,687 B2 | 2/2016 | Nanda | |
| 9,765,697 B2 * | 9/2017 | Svihla | F02C 7/20 |
| 2007/0271921 A1 | 11/2007 | Chen | |
| 2012/0167863 A1 | 7/2012 | Kulkarni | |
| 2013/0152592 A1 * | 6/2013 | Orosa | F01D 25/305 |
| | | | 60/772 |
| 2014/0245736 A1 | 9/2014 | Thoss et al. | |

FOREIGN PATENT DOCUMENTS

| | | |
|---|---|---|
| EP | 2 740 923 A1 | 6/2014 |
| GB | 947690 | 1/1964 |
| JP | S55-25505 A | 2/1980 |
| WO | WO 8000864 A1 | 5/1980 |
| WO | WO 2005042940 A2 | 5/2005 |
| WO | WO 2012004515 A2 | 1/2012 |
| WO | WO 2016030282 A1 | 3/2016 |

\* cited by examiner

WASTEGATE WITH INJECTED FLOW

The present invention relates generally to turbocharger turbines, and more particularly, to an exhaust gas diffuser configuration for a radial automotive turbocharger turbine.

BACKGROUND OF THE INVENTION

Radial turbocharger turbines are provided with diffusers extending axially downstream from a turbine wheel around a wheel centerline. The diffuser is configured to reduce airflow velocity. To accomplish this, the cross-sectional area of the diffuser increases from an upstream end of the diffuser to the downstream end of the diffuser. Because the mass flow rate through the diffuser is constant, this increased cross-sectional area provides for decreased velocity, decreased dynamic pressure, and increased static pressure.

Turbines are designed for optimal operation at a design operating condition. At this operating condition, an exhaust gas stream will enter the diffuser having substantially axial flow. Nevertheless, at so called 'off design' operating conditions (i.e., substantially different operating conditions than the design operating condition), the exhaust gas stream may be characterized by high exit swirl, which can be in either direction depending on the particular operating condition. These off design operating conditions occur frequently in turbocharger turbine operation due to pulsing inlet flow conditions, size constraints (e.g., a turbine diameter smaller than optimum), and conditions where variable nozzle guide vanes (in the turbine inlet) are operated away from their nominal position. These off design operating conditions result in a very low blade speed ratio condition for the turbine stage which results in a high degree of exit swirl.

Thus, in these off design operating conditions, while the downstream (i.e., axial portion of the) velocity of the exhaust gas stream passing through the diffuser is reduced, it will still have a significant tangential (i.e., circumferential) velocity portion (i.e., a circular motion around the axial direction). This tangential velocity portion, in combination with the axial velocity portion, creates a swirling (i.e., spiraling) exhaust gas stream. This tangential velocity portion increases the total kinetic energy of the exhaust stream over that of just the axial velocity portion, and thereby causes efficiency losses across the off design operating range of the turbine, particularly under transient conditions.

It should be noted that any effort to deal with this problem is constrained by size limitations for the turbocharger, i.e., package constraints. This is particularly true for automotive turbochargers, which typically have significant size limitations.

A traditional conical diffuser design can be very efficient when dealing with zero or low levels of inlet swirl. Nevertheless, applying a traditional conical diffuser design to a swirling flow with package constraints typically results in significant separation of the flow and inefficient diffusion. De-swirl vanes with their leading edge angle matched to the flow swirl angle can be used in attempt to manage the problem, but these only operate effectively at a small range of operating conditions because the swirl angle of the flow into the diffuser varies dramatically across the useful operating range of the turbine. Thus, the use of de-swirl vanes results in high (angle of) incidence losses into the de-swirl vanes at operating conditions that are not close to the operating conditions for which the vanes were designed.

Accordingly, there has existed a need for an automotive turbocharger turbine diffuser that is both compact and highly efficient in reducing the kinetic energy of an exhaust gas stream.

SUMMARY OF THE INVENTION

In various embodiments, the present invention may solve some or all of the needs mentioned above, providing a compact automotive turbocharger turbine diffuser that is highly efficient in reducing the kinetic energy of an exhaust gas stream.

The turbocharger turbine includes a turbine wheel and a turbine housing. The housing has housing walls that define a turbine passageway extending axially. The passageway includes a wheel chamber containing the turbine wheel. The wheel chamber extends downstream from an inducer to an exducer of the turbine wheel. The passageway further includes an outlet passage extending downstream from the exducer. This outlet passage defines a diffuser having a diffuser wall that increases in axially cross-sectional size from an upstream end of the diffuser to a downstream end of the diffuser.

The turbocharger turbine features a center body within the diffuser. This center body has a center body wall forming a de-swirl passageway within the diffuser wall and surrounding the center body. Advantageously, the presence of the center body increases the mean diameter of the exhaust gas stream. With free vortex flow, the angular momentum of the tangential portion of the flow remains constant, and thus the increase in mean diameter decreases the tangential velocity of the exhaust stream.

The turbine further features one or more de-swirl vanes that support the center body. These de-swirl vanes extend between the center body wall and the diffuser wall. Additionally, the turbine further features that the de-swirl passageway is characterized by an increasing mean diameter of flow from an upstream end of the center body to a leading edge of the one or more de-swirl vanes. Advantageously, the decreased tangential velocity of the exhaust stream reduces the angle of attack with which the exhaust gas stream strikes the de-swirl vanes during non-standard operating conditions. This decrease in the angle of attack reduces angle of incidence losses over a wide range of operating conditions. This reduces efficiency losses across the off design operating range of the turbine, particularly under transient conditions.

The turbine also features that a trailing edge of the de-swirl vanes is located in the close axial vicinity of the downstream end of the center body. Advantageously, the de-swirl vanes prevent free vortex flow, so the angular momentum of the tangential portion of the flow does not remains constant. As a result, the cross-sectional area of the stream can be significantly increased and the mean diameter can be decreased without increasing the tangential velocity of the exhaust stream.

The turbine also features annular-type guide vanes surrounding the center body between center body wall and diffuser wall. Advantageously, the annular-type guide vanes prevent separation of flow in the de-swirl passageway.

Finally, the turbine features a wastegate system that injects wastegate flow into the flow from the turbine exducer via injection ports formed in the center body, de-swirl vanes and/or annular guide vanes. Advantageously, this might be found to improve the diffusing flow in the rear section of the diffuser.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

DETAILED DESCRIPTION OF THE PREFERRED EMBODIMENTS

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them.

Typical embodiments of the present invention utilize an increase in the mean diameter of an exhaust gas stream (i.e., of flow) directly after the turbine wheel exit to reduce the swirl angle of the flow. This provides for axial or close-to-axial de-swirl vanes to be used through the remainder of the diffuser without significant angle of incidence losses over a wide range of operating conditions. In this way, effective diffusion can be managed over a wide range of inlet swirl angles, and therefore a wide range of the turbine operating conditions.

Figure 1:
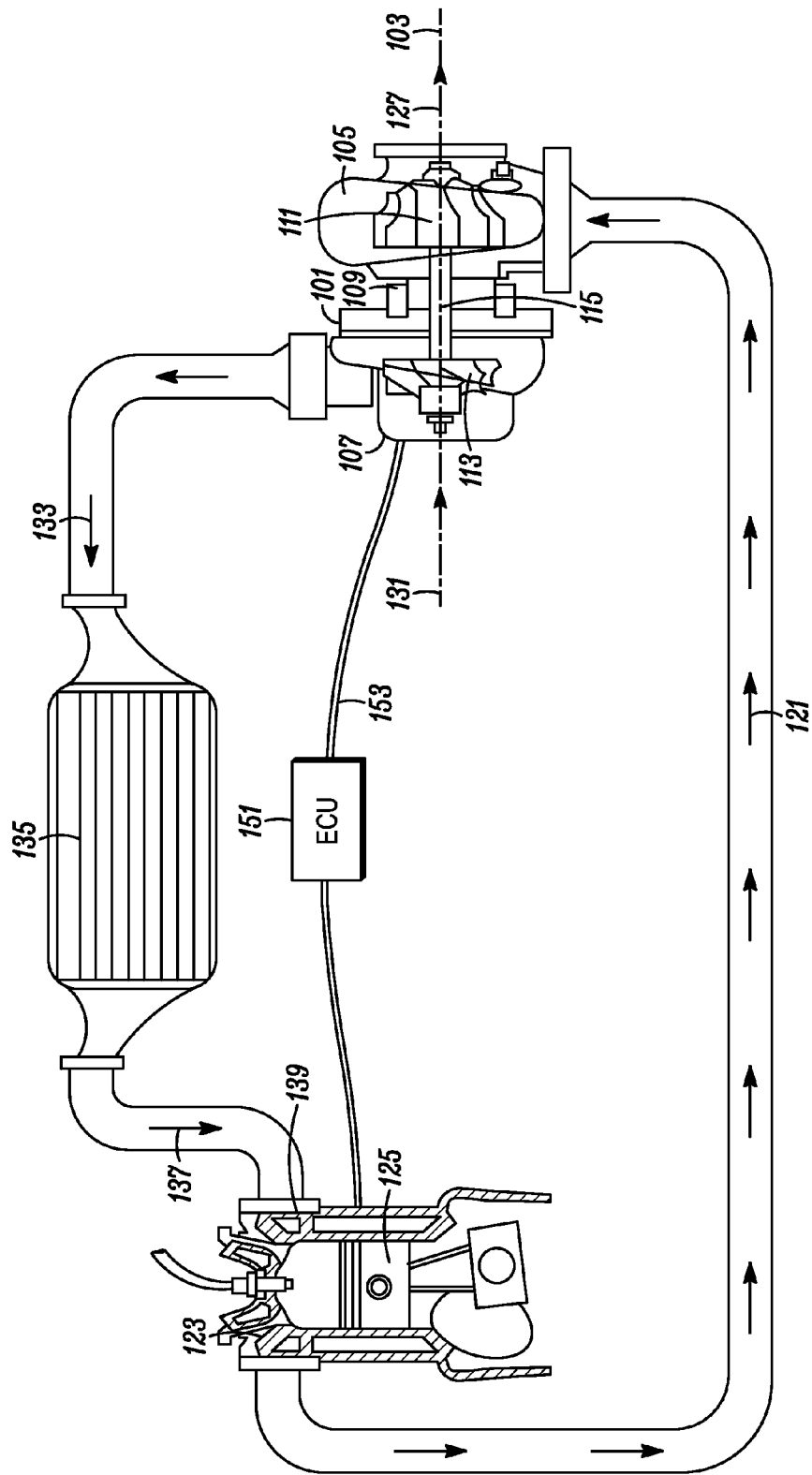
FIG. 1 is a system layout of an internal combustion engine with a turbocharger and a charge air cooler embodying the present invention.
Figure 2:
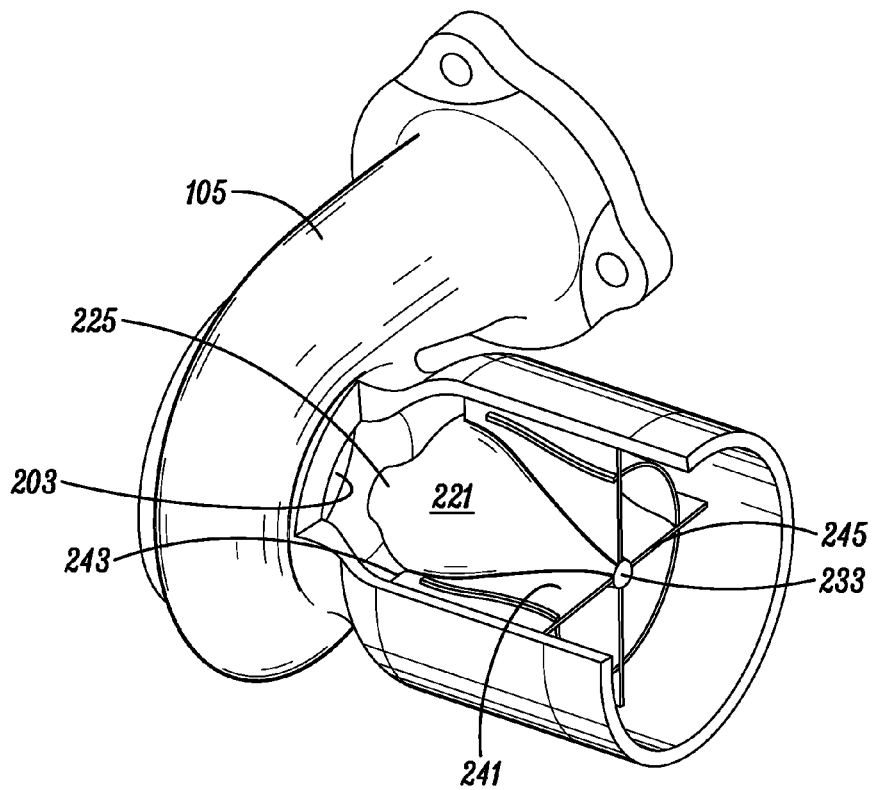
FIG. 2 is a cut-away perspective view of a turbine housing of the turbocharger of FIG. 1, and a related center body with vanes.

With reference to FIG. 1, in a first embodiment of the invention, a turbocharger 101 includes a turbocharger housing and a rotor configured to rotate within the turbocharger housing along an axis of rotor rotation 103 on thrust bearings and journal bearings (or alternatively, other bearings such as ball bearings). The turbocharger housing includes a turbine housing 105, a compressor housing 107, and a bearing housing 109 (i.e., center housing) that connects the turbine housing to the compressor housing. The rotor includes a turbine wheel 111 located substantially within the turbine housing, a compressor wheel 113 located substantially within the compressor housing, and a shaft 115 extending along the axis of rotor rotation, through the bearing housing, to connect the turbine wheel to the compressor wheel.

The turbine housing 105 and turbine wheel 111 form a turbine configured to circumferentially receive a high-pressure and high-temperature exhaust gas stream 121 from an engine, e.g., from an exhaust manifold 123 of an internal combustion engine 125. The turbine wheel (and thus the rotor) is driven in rotation around the axis of rotor rotation 103 by the high-pressure and high-temperature exhaust gas stream, which becomes a lower-pressure and lower-temperature exhaust gas stream 127 that is passed through a diffuser (not shown), and then axially released into an exhaust system (not shown).

The compressor housing 107 and compressor wheel 113 form a compressor stage. The compressor wheel, being driven in rotation by the exhaust-gas driven turbine wheel 111, is configured to compress axially received input air (e.g., ambient air 131, or already-pressurized air from a previous-stage in a multi-stage compressor) into a pressurized air stream 133 that is ejected circumferentially from the compressor. Due to the compression process, the pressurized air stream is characterized by an increased temperature, over that of the input air.

Optionally, the pressurized air stream may be channeled through a convectively cooled charge air cooler 135 configured to dissipate heat from the pressurized air stream, increasing its density. The resulting cooled and pressurized output air stream 137 is channeled into an intake manifold 139 on the internal combustion engine, or alternatively, into a subsequent-stage, in-series compressor. The operation of the system is controlled by an ECU 151 (electronic control unit) that connects to the remainder of the system via communication connections 153.

With reference to FIGS. 1 to 4, the turbine housing 105 has a housing wall 201 that defines a turbine passageway. This passageway includes a wheel chamber 203 containing the turbine wheel 111, a radial or mixed flow turbine inlet passage (not shown) leading to an inducer (not shown) of the turbine wheel (i.e., at the leading edges of the wheel blades), and an outlet passage 205 extending downstream from an exducer 207 of the turbine wheel (i.e., at the trailing edge of the wheel blades). The wheel chamber extends downstream from the inducer to the exducer of the turbine wheel.

The outlet passage 205 defines a diffuser, and the portion of the housing wall 201 within the diffuser forms a diffuser wall 211. In this embodiment, the diffuser wall starts at a diameter close to that of the wheel chamber 203 at the exducer 207, and then increases smoothly in diameter for a transitional (axial) distance 213 downstream of the exducer to reach a maximum diffuser wall diameter at a maximum diffuser wall diameter axial location 215. This maximum diffuser wall diameter axial location is to be understood as the axially upstream end of the diffuser wall at that diameter.

After the transitional distance 213, the diffuser wall 211 establishes a constant diameter in the amount of the maximum diffuser wall diameter. Thus, the diffuser wall increases in axially cross-sectional size (e.g., diameter) from an upstream end of the diffuser to the maximum diffuser wall diameter axial location 215, and therefore to a downstream end of the diffuser. For the purposes of this application, it should be understood that a "smoothly varying surface" is one having a slope angle function that is continuous.

Center Body

Within the outlet passage 205 (and the diffuser) is a center body 221 defining an (outer) center body wall 223. In this embodiment, the center body is an aerodynamic, completely rotationally symmetric body (around the axis of rotor rotation 103). For the purposes of this application, complete rotational symmetry is defined to mean that the cross-section of the center body around the axis of rotor rotation is circular at every axial location.

At an upstream end, the center body forms a nose 225 that is shaped as a conical cylinder having a diameter that increases in the downstream direction. The upstream end of this nose is substantially the size and shape of a downstream end 227 of a hub 229 of the turbine wheel 111 (i.e., the nose's size and shape are close enough to accommodate the flow without causing significant disturbance in the flow). The center body upstream end concentrically and opposingly faces the wheel hub downstream end, thus providing for smooth exhaust flow between the wheel exducer and the center body.

From the center body upstream end, the center body wall 223 smoothly increases in diameter in an axially downstream direction until it reaches a maximum diameter at a maximum center body diameter axial location 231. This location is in the close axial vicinity of the maximum diffuser wall diameter axial location. For the purposes of this application, the phrase close axial vicinity should be understood to mean in a within a range of locations through which the velocity (direction and speed) of the flow is substantially unchanged (e.g., changed less than five percent). Downstream of the maximum center body diameter axial location, the center body wall reduces smoothly in diameter down to a distal tip 233 at a downstream end of the center body 221, where it may have a rounded or pointed configuration.

Vanes

The center body 221 is structurally supported within the diffuser wall 211 by one or more, and more preferably by a plurality of (e.g., four) de-swirl vanes 241 extending through the de-swirl passageway between the center body wall 223 and the surrounding diffuser wall 211. With respect to a view in the axial direction (along the axis of rotor rotation 103), these de-swirl vanes may extend from an inner end to an outer end in a purely radial direction, or at an angle to the purely radial direction. With respect to a view in a radial direction, all of, or at least a forward portion of these vanes may extend from a leading edge 243 to a trailing edge 245 in a purely axial direction, or at an angle to the axial direction.

While the presently depicted vanes extend from a leading edge 243 to a trailing edge 245 in a purely axial direction, there may be embodiments in which having a non-axial tilt may be desirable. For example, in some embodiments slightly angling the vanes may effectively tune the system to a specific target operating condition. In other embodiments, it may be that a specific turbine stage (wheel) biases the outlet swirl in one direction more than the other. This could be for numerous reasons, such as turbine designs having blade angles that are not optimal for mechanical design reasons.

The leading edge 243 (at an upstream end) of each de-swirl vane is in the close axial vicinity of the maximum diffuser wall diameter axial location 215, and is also in the close axial vicinity of the maximum center body diameter axial location 231. To accommodate variation in the angle of attack of the exhaust air on the de-swirl vanes, larger diameter leading edges are generally to be used. The trailing edge 245 (at a downstream end) of each de-swirl vane extends to an upstream end of the distal tip 233. Therefore, the distal tip is the portion of the center body downstream of the de-swirl blade trailing edges.

Optionally, the de-swirl vanes 241 may also support annular guide vanes 251 extending around (surrounding) the center body 221 between the center body wall 223 and the diffuser wall 211 within the de-swirl passageway. The annular guide vanes combine to form an annulus having a larger diameter at a leading edge 253 (at an upstream end), and a smaller diameter at a trailing edge 255 (at a downstream end). Axially, the annular guide vane leading edges are slightly downstream of the maximum center body diameter axial location 231, the maximum diffuser wall diameter axial location 215, and the de-swirl vane leading edges 243. In at least some embodiments, the annular guide vane leading edges are located in the close axial vicinity of the de-swirl vane leading edges. Axially, the annular guide vane trailing edges extend to the de-swirl vane trailing edges, and/or are located in the close axial vicinity of the de-swirl vane trailing edges.

The axial extent of center body wall 223 and the surrounding diffuser wall 211 of the outlet passage axially define an annular de-swirl passageway within the diffuser. The de-swirl passageway is within the diffuser wall and surrounds the center body 221. From (immediately downstream of) the upstream end of the center body to the de-swirl vane leading edges 243, the de-swirl passageway both increases in mean diameter, and may somewhat increase in cross-sectional area. For convenience, this portion of the de-swirl passageway will be defined as the forward de-swirl passageway.

Functionality

In many typical embodiments, the forward de-swirl passageway is characterized by a mean diameter at the leading edges of the one or more de-swirl vanes that is in a range of 1.1 to 3.0 times the mean diameter immediately downstream of the upstream end of the center body 221 (i.e., where it is at approximately the same diameter as the downstream end 227 of the turbine wheel hub). Likewise, in many typical embodiments, the forward de-swirl passageway is characterized by a cross-sectional area at the leading edges of the one or more de-swirl vanes that is in a range of 0.8 to 1.5 times the cross-sectional area immediately downstream of the upstream end of the center body, i.e., it may be a relatively small increase to a very small decrease.

As a swirling exhaust gas stream passes out from the turbine exducer 207 and then into the forward de-swirl passageway, the exhaust gas stream is diverted radially outward by the center body wall to a larger mean diameter. The small, limited increase in cross-sectional area provides for some decrease in axial velocity, and thereby provides decreased dynamic pressure and increased static pressure. With free vortex flow, the angular momentum of the tangential portion of the flow remains constant, and thus the increase in mean diameter decreases the tangential velocity of the exhaust stream.

As a result, the swirl angle of attack of the exhaust gas stream on the de-swirl vanes 241 is significantly reduced at the de-swirl vane leading edges 243 (as compared to de-swirl vanes used without the center body). The use of de-swirl vanes with the center body therefore is subject to lower (angle of) incidence losses into the de-swirl vanes (as compared to de-swirl vanes used without the center body) at operating conditions that are not close to the operating conditions for which the de-swirl vanes were designed.

From the de-swirl vane leading edges 243 to the de-swirl vane trailing edges 245, the de-swirl passageway both decreases in mean diameter, and substantially increases in cross-sectional area. For convenience, this portion of the de-swirl passageway will be defined as the aft de-swirl passageway. The aft de-swirl passageway is subdivided into a plurality of (e.g., four, as depicted) aft de-swirl passageway portions by the de-swirl vanes 241.

As the exhaust gas stream passes through the aft de-swirl passageway, the exhaust gas stream expands radially inward toward the receding center body wall 223, thereby being characterized by a smaller mean diameter. The de-swirl vanes 241 prevent free vortex flow, and thus block increased tangential velocity of the exhaust gas stream despite the reduced mean diameter of that stream. At the same time, the greatly increased cross-sectional area provides for a significant decrease in axial velocity, and thereby provides significantly decreased dynamic pressure and increased static pressure.

Across the distal tip 233, i.e., from the de-swirl vane trailing edges 245 to the downstream end of the center body 221 (typically a very short distance), the de-swirl passageway slightly decreases in mean diameter and slightly increases in cross-sectional area. For convenience, this portion of the de-swirl passageway will be defined as the first transitional de-swirl passageway. These changes minimally increase swirl and minimally decrease axial velocity. More significantly, the first transitional passageway provides for a smooth aerodynamic end to the de-swirl passageway, limiting inefficient turbulence. This whole de-swirl system advantageously can occur within significant package constraints of a turbocharger.

If the optional annular guide vanes 251 extending around the center body 221 between the center body wall 223 and the diffuser wall 211 are included, then each aft de-swirl passageway portion may be further divided into a second transitional de-swirl passageway portion from the de-swirl vane leading edges 243 to the annular guide vane leading edges 253, an inner aft de-swirl passageway portion within the annular guide vanes (i.e., between the annular guide vanes and the center body wall) from the annular guide vane leading edges to the annular guide vane trailing edges 255, and an outer aft de-swirl passageway portion outside of the annular guide vanes (i.e., between the annular guide vanes and the diffuser wall) from the annular guide vane leading edges to the annular guide vane trailing edges.

The inner aft de-swirl passageway portions combine to form an inner aft de-swirl passageway. Likewise, the outer aft de-swirl passageway portions combine to form an outer aft de-swirl passageway. The second transitional passageway helps prevent interference in the flow between the effects of the flow by the de-swirl vane leading edges 243 and the effects of the flow by the annular guide vane leading edges 253. The primary function of the annular guide vanes is to prevent separation of flow in the aft de-swirl passageway.

In an alternative embodiment where the de-swirl vane trailing edges 245 extend further downstream that the annular guide vane trailing edges 255, the aft de-swirl passageway further includes a third transitional passageway having a plurality (e.g., four) of circumferential portions from the de-swirl vane trailing edges 245 to the annular guide vane trailing edges 255. In another alternative embodiment where the de-swirl vane trailing edges 245 end upstream of the annular guide vane trailing edges 255, the first transitional passageway is subdivided into a plurality of portions.

Wastegate with Injected Flow

Figure 3:
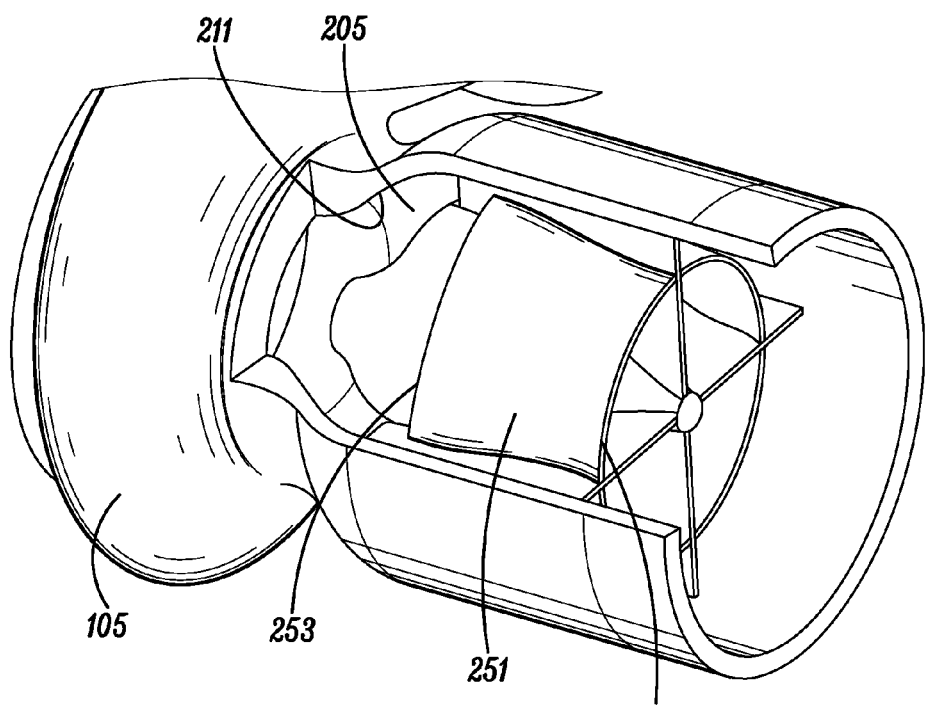
FIG. 3 is a second cut-away perspective view of a turbine housing of the turbocharger of FIG. 1, and a related center body with vanes.
Figure 4:
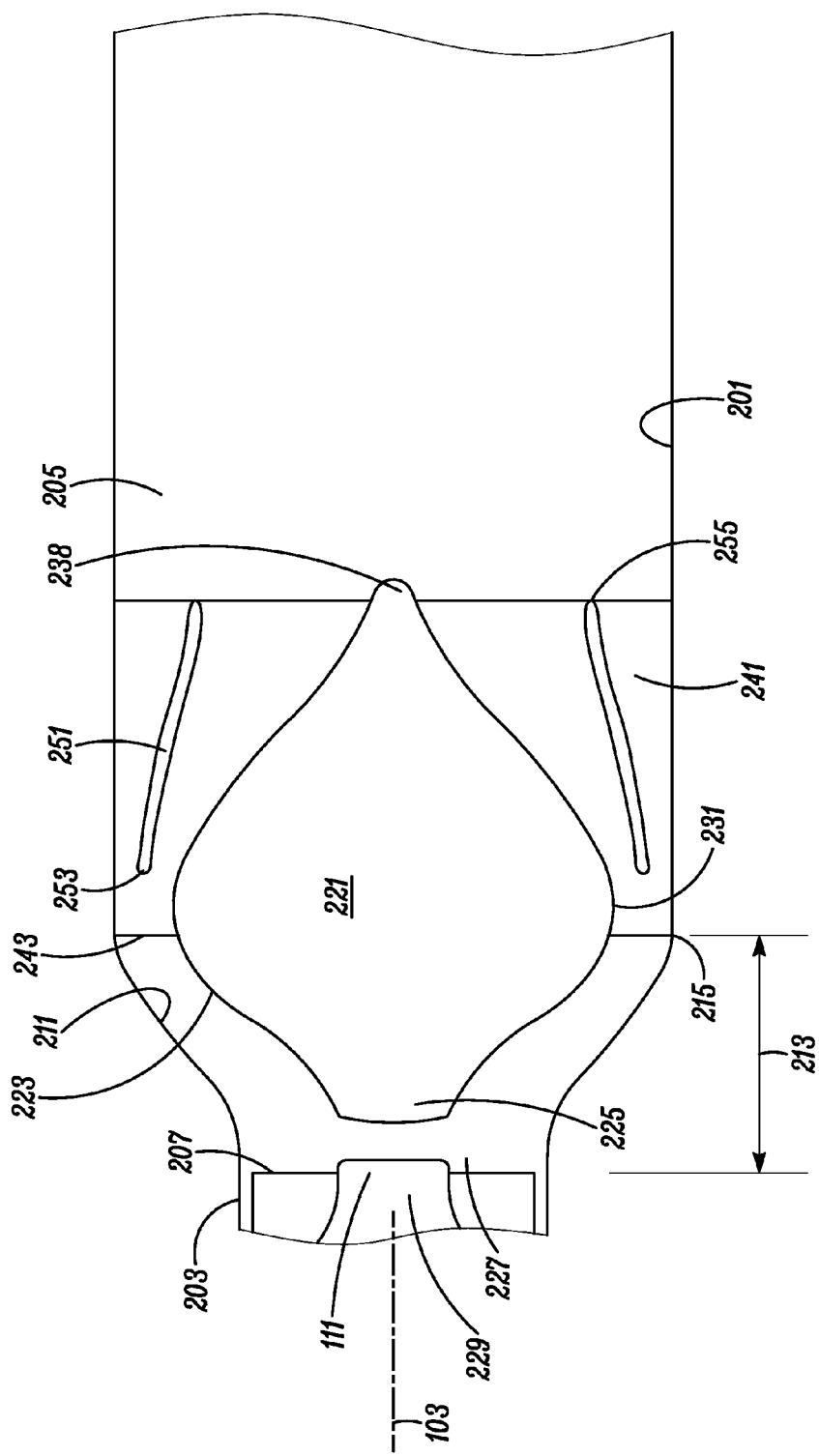
FIG. 4 is a cut-away front schematic view of the turbine housing of FIG. 2, showing a center body and vanes.
Figure 5:
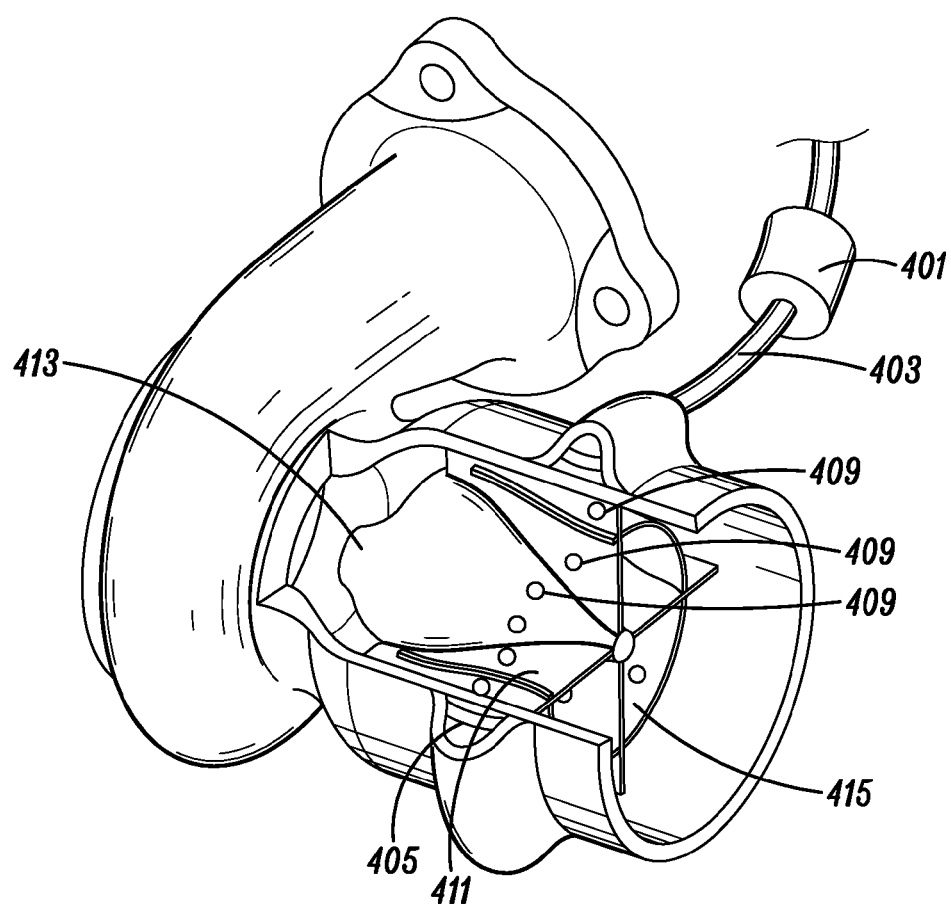
FIG. 5 is a cut-away front perspective view of a turbine housing of a second embodiment of the invention, showing wastegate injection features.

With reference to FIGS. 3 and 5, a second embodiment of the turbine is provided with a wastegate system. The second embodiment is very similar to the first embodiment other than the wastegate features. The wastegate system provides a turbine bypass using a controllable valve 401 (as is known), such that exhaust flow can be directly vented from a turbine inlet passage location upstream of the inducer of the turbine wheel to a location in the outlet passageway downstream of the exducer of the turbine wheel. Rather than directly dumping the full wastegate flow into the flow from the turbine wheel exducer ("the exducer flow") through an opening in the outlet passageway wall, the present embodiment injects wastegate flow into the outlet passageway from within the exducer flow.

The wastegate system forms passageways, being serially defined by the wastegate controllable valve 401, a flow channel 403, a wastegate exhaust port 405 in the outlet passageway wall, and an injection body. The wastegate system controllably places the outlet passage in fluid communication with an exhaust flow upstream of the inducer (i.e., an inlet flow). The injection body has interior walls that define a hollow interior of the injection body, the hollow interior being in direct fluid communication with the wastegate exhaust port (i.e., it directly connects wastegate flow from the wastegate exhaust port without the wastegate flow first intermixing with the exducer flow). The injection body in turn injects the wastegate flow into the exducer flow from within that exducer flow through one or more injection ports 409.

The injection body includes one or more injection body supports 411 that connect to the outlet passageway wall downstream of the exducer. The injection body supports form a hollow interior that is in direct fluid communication with the wastegate exhaust ports 405.

Optionally, the injection body may also include an injection center body 413 within the walls of the exducer flow (i.e., inside the wall of the outlet passageway). The injection center body may form a hollow interior that is in direct fluid communication with the hollow interior of the one or more injection body supports. The injection center body is structurally supported within the wall of the outlet passageway by the injection body supports. The injection ports 409 place the hollow interior of the injection body in fluid communication with the exducer flow from within the exducer flow (i.e., within and at a distance from the outlet passageway wall).

Optionally, the injection body may include other structures. For example, may include hollow injection annular vanes 415. These injection annular vanes might or might not form injection ports 409.

In the present embodiment, the injection body includes the previously described de-swirl vanes 241, annular guide vanes 251 and center body 221. The four de-swirl vanes 241 are the one or more injection body supports 411 that connect to the outlet passageway wall downstream of the exducer. The center body 221 is the injection center body 413, and the annular guide vanes 251 are the injection annular vanes 415. Some or all of the de-swirl vanes are hollow. Optionally, the annular guide vanes and/or the center body are also hollow, placing the four de-swirl vanes in fluid communication with one-another. At the outlet passage wall, the de-swirl vanes connect to flow wastegate exhaust ports 405 that place the wastegate flow from the controllable wastegate valve in fluid communication with the hollow interiors of the de-swirl vanes.

The injection ports 409 could be formed in any or all of the de-swirl vanes, the annular guide vanes and the center body. For example, with the de-swirl vanes and the center body hollow, the injection ports might be formed in only the center body. The wastegate flow could then exit through the rear side of the centre body through one or more injection ports to mix with the exducer flow. This might be found to improve the diffusing flow in the rear section of the diffuser.

Other Embodiments

While the present embodiment is is characterized by a circular duct and a center body having circular cross-sections (when taken perpendicular to the axial direction), embodiments having other axial cross-sectional shapes are contemplated within the scope of the invention. There can be various reasons for non-circular embodiments, such as package constraints. These non-circular embodiments may be considered to have annular-type passageways and annular-type guide vanes, in that they are a non-circular variation of their annular counterparts. For the purpose of this application, the term annular-type should be understood to include ring-like passageways and structures, including both ones characterized by circular and non-circular cross-sections, that are further characterized by inner and outer boundaries surrounding an axis.

Other embodiments of the invention may employ variations of the above-described elements. For example, while the diffuser wall is described as increasing in size to a maximum diffuser wall diameter axial location, alternative embodiments could employ a diffuser wall that increases significantly prior to reaching the de-swirl vanes, and then continues to increase in size for some distance after the de-swirl vanes. Thus, the detailed description of particular preferred embodiments, as set out above to enable one to build and use an embodiment of the invention, are not intended to limit the enumerated claims, but rather, they are intended to serve as particular examples of the claimed invention.

The present invention may be incorporated into a wide variety of turbocharger turbines. For example, it may be used with both fixed geometry and variable geometry turbines.

It is to be understood that various embodiments of the invention comprise apparatus and related methods for turbine efficiency. Additionally, the various embodiments of the invention can incorporate various combinations of the features described above with other related efficiency features. In short, the above disclosed features can be combined in a wide variety of configurations within the anticipated scope of the invention.

What is claimed is:

1. A turbocharger turbine, comprising:
   a turbine wheel;
   a housing having housing walls that define a turbine passageway extending axially, the passageway including a wheel chamber containing the turbine wheel, the wheel chamber extending downstream from an inducer to an exducer of the turbine wheel, and an outlet passage extending downstream from the exducer and defining a region of exducer flow, wherein the housing walls include an outlet passage wall surrounding the outlet passage;
   a wastegate system having a controllable valve that controllably places the outlet passage in fluid communication with an inlet flow upstream of the inducer via a wastegate exhaust port; and
   an injection body within the outlet passage, the injection body having an injection body hollow interior in direct fluid communication with the exhaust flow from the wastegate exhaust port;
   wherein the injection body includes one or more injection ports placing the injection body hollow interior in fluid communication with the outlet passage within the exducer flow.

2. The turbocharger turbine of claim 1, wherein the injection body includes one or more injection body supports connecting directly to the outlet passage wall, each injection body support defining an injection body support hollow interior that is part of the injection body hollow interior, and that is in direct fluid communication with the wastegate exhaust port via the outlet passage wall.

3. The turbocharger turbine of claim 2, wherein the one or more injection body supports have outer surfaces that form de-swirl vanes.

4. The turbocharger turbine of claim 2, wherein the injection body includes an injection center body defining a center body hollow interior that is in direct fluid communication with the injection body support hollow interior of the one or more injection body supports, wherein the center body hollow interior and the injection body support hollow interior combine to form the injection body hollow interior, wherein the injection center body is structurally supported by the one or more injection body supports.

5. The turbocharger turbine of claim 4, wherein at least some of the one or more injection ports are formed on the injection center body.

6. The turbocharger turbine of claim 4, wherein all of the one or more injection ports are formed on the injection center body.

7. The turbocharger turbine of claim 4, wherein the injection body includes an injection annular guide vane defining a hollow interior that is in direct fluid communication with the hollow interior of the one or more injection body supports, the injection annular guide vane being structurally supported by the one or more injection body supports.

8. The turbocharger turbine of claim 2, wherein the injection body includes an injection annular guide vane defining a hollow interior that is in direct fluid communication with the hollow interior of the one or more injection body supports, the injection annular guide vane being structurally supported by the one or more injection body supports.

* * * * *